United States Patent
Takimoto et al.

(10) Patent No.: US 6,720,377 B2
(45) Date of Patent: Apr. 13, 2004

(54) COLOR PIGMENT MASTER BATCH AND BLOW MOLDING METHOD USING THE SAME

(75) Inventors: Masami Takimoto, Chiba (JP); Toshihisa Miyaoka, Chiba (JP); Takeshi Watanabe, Saitama (JP)

(73) Assignees: Idemitsu Petrochemical Co., Ltd., Tokyo (JP); Tokyo Printing Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/018,012

(22) PCT Filed: Apr. 17, 2001

(86) PCT No.: PCT/JP01/03269

§ 371 (c)(1),
(2), (4) Date: Mar. 28, 2002

(87) PCT Pub. No.: WO01/81455

PCT Pub. Date: Nov. 1, 2001

(65) Prior Publication Data

US 2003/0040556 A1 Feb. 27, 2003

(30) Foreign Application Priority Data

Apr. 17, 2000 (JP) .......................................... 11-115040

(51) Int. Cl.$^7$ ................................................. C08J 3/22
(52) U.S. Cl. .................. 524/423; 524/439; 524/492; 524/493; 524/494; 525/439; 525/444
(58) Field of Search ................................. 524/423, 439, 524/492, 493, 494; 525/439, 444

(56) References Cited

U.S. PATENT DOCUMENTS 6,046,265 A    4/2000    Clark et al.

FOREIGN PATENT DOCUMENTS

| | | |
|---|---|---|
| EP | 0 906 817 A1 | 4/1999 |
| EP | 0 930 330 A2 | 7/1999 |
| EP | 1 201 702 A1 | 5/2002 |
| JP | 61-81454 | 4/1986 |
| JP | 1-108268 | 4/1989 |
| JP | 2-68374 | 3/1990 |
| JP | 5-278099 | 10/1993 |
| JP | 8-3417 A | 1/1996 |
| JP | 8-11753 | 1/1996 |
| JP | 8-216233 A | 8/1996 |
| JP | 8-319419 | 12/1996 |
| JP | 10-324751 | 12/1998 |
| JP | 11-43582 A | 2/1999 |
| JP | 2000-33925 | 2/2000 |
| JP | 2000-186152 A | 7/2000 |
| JP | 2001-279029 A | 10/2001 |
| JP | 2001-302808 A | 10/2001 |
| JP | 2002-096376 A | 4/2002 |

*Primary Examiner*—Kriellion A. Sanders
(74) *Attorney, Agent, or Firm*—Oblon, Spivak, McClelland, Maier & Neustadt, P.C.

(57) ABSTRACT

A color pigment master batch having a high recycling property and a process for producing a blow-molded article having a grain-tone appearance using this color pigment master batch. The color pigment master batch for blow molding includes a pigment and a carrier resin. The carrier resin is a thermoplastic elastomer which is a crystalline or amorphous thermoplastic elastomer having a Vicat softening point higher than a melting temperature of a molding base resin and a crystal melting point or a flow-starting temperature higher by 20° C. or more than a melting temperature of the molding base resin and in which an MFR ratio thereof to the molding base resin is 5 or more.

8 Claims, No Drawings

COLOR PIGMENT MASTER BATCH AND BLOW MOLDING METHOD USING THE SAME

TECHNICAL FIELD

The present invention relates to a color pigment master batch for obtaining a blow-molded article having a grain-tone appearance and a blow molding method using the same. The color pigment master batch of the present invention can produce a clear grain tone without particularly adjusting blow molding conditions by using a specific thermoplastic elastomer and can make it easy to recycle molding burrs generated in producing blow molded articles.

BACKGROUND ART

In recent years, products such as interior household articles having appearances of a grain tone and a marble tone are prevailing, and particularly a lot of products on which films printed with a grain pattern and a marble pattern are stuck are available in the market as such products. These patterns are artificially produced as imitations of natural matters, but they are abstract and have natural feelings, so that they are in a boom as a pattern having a "healing" effect. In addition to products using films printed with these patterns, products having appearances of a grain tone and a marble tone have come to be produced as well by an injection molding method and an extrusion molding method, and in order to obtain products having a thick feeling, it has been started to be investigated to produce them by a blow molding method.

In producing products having appearances of a grain tone and a marble tone, resin pellets which are dry-blended with a pigment master batch having a relatively inferior dispersibility are molten and extruded to produce flow stripes of the pigment by virtue of flowing and drawing effects of the resin in extruding, whereby specific stripe patters are produced. Wooden members in which a grain tone is revealed by adding wooden powder and a foaming agent are produced by a heterogeneous extrusion method, and these wooden members are prevailingly used for housing products. Further, pigments which have been developed for use in such wooden members have come to be used as well in a blow molding method to develop products, but the existing state is that they are not prevailing so much because of a low blow-molding aptitude of the pigments.

Resin-molded articles having appearances of stripe patterns such as a grain tone and a marble tone are produced basically by dry-blending and molding a colored master batch in which dispersion of a pigment for a stripe pattern into a molding base resin is not caused over a fixed level through a plasticizing step and an extruding step of a molding material and using a pigment-dispersed pattern for an appearance design. The appearance of a marble tone is expressed by thick and thin stripes of a pigment for a stripe pattern including an inside of the product, and the appearance of a grain tone is expressed by stripe patterns produced on a surface of the product. In a step of producing a grain pattern by a stripe pattern on a surface of the product, (1) a molding base resin is dry-blended with a pigment master batch for a grain tone and a base color pigment master batch which presents a ground color to be plasticized and extruded; (2) the pigment master batch for a grain tone molten in an extruding step is turned into islands and extruded while gradually pulled to a wall face side of an extruding passage; (3) when reaching the vicinity of the wall face having a large shearing stress, the islands of the molten pigment master batch for a grain tone are stretched to produce continuous long stripes; (4) the pigment appears in the form of stripes on the surface of the molded article extruded; and (5) the pigment for a grain tone short of stretching which remains in the inside in a depth of over a fixed level from the molded article is masked by the pigment of a base color and can not be observed from the outside, and only the stripe patterns on the surface come to be resultingly observed.

The situation is the same also in a blow molding method. In the case of the blow molding method, an extruding speed is slow as compared with those of other molding methods, and an extruding viscosity of a molding material is high. Accordingly, there is the problem that it is difficult to deform the pigment master batch for a grain tone and draw it out to the outside. High melting-point resins of an engineering plastic base such as a polyester base, a polyamide base and an acryl base and partially cross-linked olefin base resins have so far been used as a carrier resin used for a pigment master batch for a grain tone. Those prepared by using the above resins are used as a pigment master batch for a grain tone in a blow molding method as is the case with the other processing methods. However, it is difficult to obtain distinct stripe patterns, and they are used at the sacrifice of the molding conditions in many cases in order to produce the stripe patterns.

However, even if the molding conditions are sacrificed, the pigment resultingly settles down into the inside, so that a stripe feeling is not revealed, or the pigment separates from the carrier resin to be turned into mere blurs. In order to solve this, a master batch containing a mutable carrier resin is used in a certain case, but the carrier resin is dispersed in an extruding step, and stripe patterns are not resultingly obtained. Further, a large problem observed in using these conventional pigment master batches for a grain tone resides in that if molding burrs are mixed in as a recycling material, the ground color of the grain pattern changes and is not stabilized. This is considered attributable to that the pigment remaining in the inside of the carrier resin which has once been molded and molten does not separate from the carrier resin when molten again, so that the grain color is overlapped on the ground color while accumulated whenever recycled. Such inconvenience leads to an increase in a production cost including a material cost and a recycling cost. Further, a reduction in the impact property and the pinch-off strength affected by the carrier resin which is incompatible with the molding base resin is not yet solved, and a totally satisfactory grain-tone article has not been able to be obtained in blow molding, particularly blow molding in which a polyolefin base resin is used as a molding base resin.

DISCLOSURE OF THE INVENTION

An object of the present invention is to provide a color pigment master batch which is suited to blow molding conditions and mechanical characteristics of a blow molding machine in blow molding in which used is a polyolefin resin, particularly polypropylene delayed in development and spread for grain-tone household articles and which has a high recycling property and a process for producing a blow-molded article having a grain-tone appearance using this color pigment master batch.

Intensive researches were repeated by the present inventors from the viewpoints that suited to blow-molding characteristics as a color pigment master batch for obtaining grain patterns are those having the characteristics that (1) stripes having a grain tone are produced without changing the molding conditions to a large extent, that is, the stripes are distinctly revealed on the surface of the article under general molding conditions, (2) molding burrs have a good recycling property, that is, when a recycled material is mixed in, a residual grain color of the recycled material is quickly redispersed, and a change in the color is not caused in every molding and (3) a reduction in the physical properties is not caused, that is, a reduction in the pinch-off strength is less liable to be caused, and the impact performance is not lowered. As a result thereof, they have found that the object described above can be achieved by using as a carrier resin in a color pigment master batch, a thermoplastic elastomer which is a crystalline thermoplastic elastomer having a specific Vicat softening point and a specific crystal melting point and in which an MFR (melt flow rate) ratio to a molding base resin is not less than a specific value or using as a carrier resin in a color pigment master batch for blow molding, a thermoplastic elastomer which is an amorphous thermoplastic elastomer having a specific Vicat softening point and a specific flow-starting temperature and in which an MFR (melt flow rate) ratio to a molding base resin is not less than a specific value. The present invention has been completed based such knowledge.

That is, the present invention provides a color pigment master batch for blow molding comprising a pigment and a carrier resin, characterized by using as the carrier resin, a thermoplastic elastomer which is a crystalline thermoplastic elastomer having a Vicat softening point higher than a melting temperature of a molding base resin (base resin which is blow-molded) and a crystal melting point higher by 20° C. or more than a melting temperature of the molding base resin and in which an MFR (melt flow rate) ratio (MFR of the thermoplastic elastomer/MFR of the molding base resin) to the molding base resin is 5 or more.

Also, the present invention provides a color pigment master batch for blow molding comprising a pigment and a carrier resin, characterized by using as the carrier resin, a thermoplastic elastomer which is an amorphous thermoplastic elastomer having a Vicat softening point higher than a melting temperature of a molding base resin and a flow-starting temperature higher by 20° C. or more than a melting temperature of the molding base resin and in which an MFR (melt flow rate) ratio (MFR of the thermoplastic elastomer/ MFR of the molding base resin) to the molding base resin is 5 or more.

Further, the present invention provides a blow molding method using these color pigment master batches for blow molding to obtain a molded article having streaky colored stripes and a blow-molded article which is molded using the same.

THE MOST PREFERRED EMBODIMENT TO CARRY OUT THE INVENTION

In the color pigment master batch of the present invention, the specific thermoplastic elastomer described above is used as a carrier resin, and the thermoplastic elastomer has the following reasons why it is excellent in a blow molding aptitude.
(1) It has a structure in which a low melting point polymer (soft segment) and a high melting point polymer (hard segment) are continuous, and therefore the mechanical characteristics and the melting point can be controlled by combination of both. This makes it possible to adjust to the blow-molding conditions, the softening temperature and the melt-starting temperature which are the temperature parameters of the carrier resin important for controlling the dispersion of the pigment.
(2) It is a material having a rubbery property, so that it is liable to be deformed even at a stage where the flow property is not shown (area where the Vicat softening point is exceeded but the crystal melting point or the melt-starting temperature is not exceeded), and the master batch itself can be drawn or suitably crushed while suppressing elution of the pigment. This prevents the master batch from being late in eluting when exceeding the melting temperature and makes it easy to produce stripe patterns of a grain tone.
(3) It is reduced in a viscosity to a large extent after molten, so that it is liable to be extruded to the surface side of the flow passage followed with the pigment and follow the flow. Accordingly, the stripe patterns of a grain tone are liable to be produced.
(4) The elastomer which is once molten, drawn and deformed to a thin form is readily deformed by heating again and broken, and it is dispersed into the molding base resin. All the pigments are released from the carrier resin including the thermoplastic elastomer in this step, so that it is excellent in a recycling property as described later.
(5) The soft segment part in the thermoplastic elastomer has a high compatibility with the whole part of the resin and contributes to the physical properties in the form of a modifier. This is a characteristic contributing to prevention of a reduction in the pinch-off strength and the impact strength.

The thermoplastic elastomer which is the carrier resin in the color pigment master batch of the present invention is a specific crystalline thermoplastic elastomer or a specific amorphous thermoplastic elastomer. The crystalline thermoplastic elastomer and the amorphous thermoplastic elastomer are largely divided primarily by the properties of the hard segment part. The crystalline thermoplastic elastomer and the amorphous thermoplastic elastomer have characteristics individually, and they may be suited in terms of the characteristics of a Vicat softening point, an eluting temperature (a crystal melting point or a flow-starting temperature) and an MFR in the present invention, and the kind of the thermoplastic elastomer shall not specifically be restricted.

In the present invention, the thermoplastic elastomer has to have a higher Vicat softening point than a melting temperature of the molding base resin. The molding material and the color pigment master batch comprising the thermoplastic elastomer as the carrier resin which are put into a hopper are moved while rubbed to each other by a large frictional force and crushing force in a step where they are transported in a plasticizing cylinder in a solid state, and therefore the solid characteristics in which the sufficiently high abrasion resistance and rigidity are maintained are required until the molding material exceeds a melting temperature and is molten. After passing through the solid-transporting part, a temperature in the cylinder is gradually elevated to exceed a Vicat softening point of the thermoplastic elastomer, and the thermoplastic elastomer starts to be reduced in an elastic strength to a large extent. If the thermoplastic elastomer exceeds a Vicat softening point too much at an early stage in a plasticizing step, the pigment master batch containing the thermoplastic elastomer is divided into pieces by virtue of a kneading force with a plasticizing screw, and the pigment itself results in being released. In the plasticizing conditions of the molding material, it is preferred that a heater-setting temperature under the hopper is controlled to not higher than a Vicat softening point of the thermoplastic elastomer and that a temperature up to an outlet of a subsequent plasticizing cylinder is slowly elevated in a temperature range extending from a Vicat softening point of the thermoplastic elastomer up to the crystal melting point or the flow-starting temperature. In other words, the thermoplastic elastomer contained in the pigment master batch has to have a higher Vicat softening point than the heater-setting temperature under the hopper and a higher crystal melting point or flow-starting temperature than an outlet temperature of the plasticizing cylinder. This temperature condition range is broadened depending on the molding material and the mechanical characteristics, and as described above, these temperature characteristics can be controlled in the thermoplastic elastomer, so that it becomes possible to produce the pigment master batch according to requirements. The Vicat softening point is measured based on ASTM D 1525.

In respect to an eluting temperature of a thermoplastic elastomer, the crystal melting point is regarded as the eluting temperature in the case of a crystalline thermoplastic elastomer, and the eluting temperature is not distinct in the case of an amorphous thermoplastic elastomer, so that the flow-starting temperature measured by means of a Kōka type flow tester is generally regarded as the eluting temperature. Further, while using this eluting temperature as a standard, the suitability of the plasticizing state is judged by observing an eluting state of the thermoplastic elastomer in an outlet of a plasticizing cylinder in a blow molding machine and a deforming state of the master batch. In the present invention, it has been judged that a crystal melting point or a flow-starting temperature of the thermoplastic elastomer has to be higher by 20° C. or more than a melting temperature of the base resin in terms of a conventional plasticizing temperature profile in blowing. In the present invention, if a crystal melting point or a flow-starting temperature of the thermoplastic elastomer is higher than a melting temperature of the base resin but a temperature difference therebetween is lower than 20° C., caused is the inconvenience that the color pigment is less liable to provide distinct grain patterns and stripe patterns. The crystal melting point is determined by means of a differential scanning type calorimeter.

In respect to an MFR of the thermoplastic elastomer, a ratio (MFR of the thermoplastic elastomer/MFR of the molding base resin) of an MFR of the thermoplastic elastomer to an MFR of the molding base resin which is measured based on measuring conditions (for example, polypropylene: 230° C., load 2.16 kg (21.2N) and high density polyethylene: 190° C., load 2.16 kg (21.2N)) for MFR prescribed on the molding base resin used has to be 5 or more, and it is preferably 10 or more, particularly preferably 20 or more. An upper limit of the MFR ratio shall not be restricted, but if it is larger than necessary, draw down is increased in molding. If this MFR ratio is less than 5, brought about is the inconvenience that the pigment is less liable to appear on the surface or spread. An MFR of the molding base resin shall be described later. The MFR is measured based on ASTM D 1238.

The carrier resin in the color pigment master batch of the present invention comprises the thermoplastic elastomer having the characteristics described above, and the thermoplastic elastomer is selected from polyester base elastomers, polyamide base elastomers, polyurethane base elastomers and polyolefin base elastomers. In particular, the polyester base elastomers are preferred. To be specific, the polyester base elastomers include Pelprene P (polyester-polyether type using an aliphatic polyether, manufactured by Toyo Boseki Co., Ltd.), Pelprene S (polyester-polyester type using an aliphatic polyester, manufactured by Toyo Boseki Co., Ltd.), Hitorel (multiblock copolymer of a polyetherester base in which an aromatic polyester (comprising primarily PBT) is used for a hard segment and an aliphatic polyether (PTMG or PPG) is used for a soft segment, manufactured by Du Pont Co., Ltd.) and Lormod (using a crystalline polyester having a high melting point for a hard segment and a modified polyether for a soft segment, manufactured by GE Co., Ltd.).

The composition of the color pigment master batch of the present invention can comprise 1 to 99.9% by weight of the thermoplastic elastomer having the characteristics described above, 0 to 70% by weight of an olefin base resin, 1 to 70% by weight of the pigment and 0 to 20% by weight of the other additives. The other additives include a lubricant, a modified thermoplastic resin and the like. The thermoplastic elastomer contained in the color pigment master batch has a content of preferably 20 to 90% by weight, particularly preferably 40 to 70% by weight. The pigment component contained in the color pigment master batch has a content of preferably 10 to 50% by weight, particularly preferably 20 to 40% by weight. The olefin base resin shall not be essential and contributes to a rise in a kneading property in producing the master batch.

A sufficiently satisfactory grain-tone appearance can be obtained by adding 0.1 to 5% by weight of the color pigment master batch for a grain tone in terms of the pigment to the molding material. The addition amount of the color pigment master batch is different according to uses of the blow-molded article and a difference in a covering power of the base color pigment, and in the case of usual articles having a grain-tone appearance, a satisfactory grain-tone feeling is obtained by adding about 0.3% by weight in terms of the pigment.

The molding base resin shall not specifically be restricted as long as it is a thermoplastic resin and can be blow-molded, and it includes, for example, polyolefin, polystyrene, polycarbonate, polyacetal, polyester and polyamide. In particular, polyolefin is suited to molding. The resin characteristics shall not specifically be restricted as long as blow molding is possible, but if the MFR is too high, it is disadvantageous for blow molding. In the case of, for example, polypropylene, the MFR [230° C., load: 2.16 kg (21.2N)] is preferably 0.1 to 5 g/10 minutes, particularly preferably 0.1 to 2 g/10 minutes. The MFR was measured based on ASTM D 1238.

To explain the blow molding method in the present invention in further details, when the thermoplastic resin (carrier resin) contained in the color pigment master batch is crystalline, a temperature of the molding material comprising the molding base resin and the color pigment master batch at a tip part of a plasticization extruding device in a blow molding machine is controlled so that it is not lower than a Vicat softening point and not higher than a crystal melting point of the thermoplastic elastomer contained in the above master batch. The above molding material controlled in a temperature is delivered to an extruding head to heat the above molding material to a higher temperature than a crystal melting point of the thermoplastic elastomer contained in the master batch described above, and then it is extruded from the extruding head described above, whereby a blow-molded article is produced.

On the other hand, when the thermoplastic resin contained in the color pigment master batch is amorphous, a temperature of the molding material comprising the molding base resin and the color pigment master batch at the tip part of the plasticization extruding device in the blow molding machine is controlled so that it is not lower than a Vicat softening point and not higher than a flow-starting temperature of the thermoplastic elastomer contained in the above master batch. The above molding material controlled in a temperature is delivered to the extruding head to heat the above molding material to a higher temperature than a flow-starting temperature of the thermoplastic elastomer contained in the above master batch, and then it is extruded from the extruding head described above, whereby a blow-molded article is produced.

The temperature at the tip part of the plasticization extruding device, that is, the most preferred temperature as a temperature of the plasticizing cylinder resides in a level of (crystal melting point −15° C. to (crystal melting point −5° C. when the crystalline thermoplastic elastomer is used as the carrier resin. The reason therefor is that if the temperature stays in the vicinity of a crystal melting point of the thermoplastic elastomer, the thermoplastic elastomer has a small flow property but dispersion and division are less liable to be caused, and the pigment can be inhibited from being released from the carrier resin.

Then, the molding material is delivered to the extruding head. The carrier resin which is deformed by stretching, squashing and suitably dividing is elevated very much in a heat response, so that if the inside of the extruding head stays in a higher temperature condition than a crystal melting point of the thermoplastic elastomer, the carrier resin falls quickly into a melting state and is rapidly reduced in a viscosity. However, when the crystallization latent heat is large, time has to be controlled or a temperature in the extruding head has to be elevated. The carrier resin which is reduced in a viscosity is readily drawn out to a wall face side of a blowing die having a high shearing stress, and therefore stripy patterns are liable to appear on the surface of the molded article. If the molten master batch is extruded to the wall face side in the form of islands, it is easily stretched by a shearing stress.

The same as described above shall apply when an amorphous thermoplastic elastomer is used as the carrier resin, and in this case, a "flow-starting temperature" shall be substituted for a "crystal melting point".

When used as the thermoplastic elastomer is, for example, a conventional polyester base elastomer having a hard segment of a PBT (polybutylene terephthalate) and a soft segment of a polyether base, the Vicat softening point, the crystal melting point and the melt viscosity can be controlled by the percentages in synthesis, and therefore the carrier resin which does not reduce the blow molding property, particularly the draw down performance can be prepared.

When a molded article is produced by the blow molding method according to the present invention, a base color pigment which becomes a background (foundation) of a grain pattern is preferably added to the molding material. The base color pigment may be added as it is but is preferably added in the form of a master batch. A pigment which is the same as the pigment for a grain tone except that a color tone is different is preferably used for the base color pigment, and the master batch can be obtained by mixing this pigment into the carrier resin. The carrier resin for the base color pigment master batch is preferably a resin having a melting temperature which is not higher than a melting temperature of the molding base resin and includes, for example, low density polyethylene, high density polyethylene, linear low density polyethylene and polypropylene. An addition amount of the base color pigment master batch is preferably 1 to 10% by weight, particularly preferably 1 to 3% by weight in terms of the pigment based on the molding material. An addition amount of the color pigment master batch can be set, as described above, to 0.1 to 5% by weight in terms of the pigment based on the molding material.

When producing blow-molded articles, molding burrs are generated in the periphery of a cavity in a molding die in a conventional blow molding method. In general, these burrs are subjected to crushing treatment or pelletized again and added to a molding material in a prescribed amount to be recycled and used. In this case, an amount of a pigment master batch from which an amount of the residual pigment contained in the recycled material is deducted is usually added. In the present blow molding, however, in respect to a pigment for revealing a grain, an equivalent amount of the color pigment master batch has to be added whenever recycled once (hereinafter abbreviated as every time) regardless of an addition amount of the recycled material. When adding a fixed amount of the pigment component regardless of an addition amount of the recycled material to recycle it, a final percentage of the pigment component contained in the article converges into a fixed value, and it is [(addition percentage of pigment component added every time)+(addition percentage of pigment component added every time)×(addition percentage of recycled material)×10$^{-}$2÷(1−(addition percentage of recycled material)×10$^{-2}$)]. The specific examples shall be shown in the following table.

TABLE 1

| Recycling frequency | Addition rate of fresh molding base resin (wt %) | Addition rate of recycled material (wt %) | Base color pigment added to every time resin (wt %) | Grain color pigment added to every time resin (wt %) | Base color pigment of molded article obtained (wt %) |
| --- | --- | --- | --- | --- | --- |
| 0 | 100 | 0 | 2 | 0.5 | 2 |
| 1 | 50 | 50 | 1 | 0.5 | 2.25 |
| 2 | 50 | 50 | 1 | 0.5 | 2.38 |
| 3 | 50 | 50 | 1 | 0.5 | 2.44 |
| 7 | 50 | 50 | 1 | 0.5 | 2.50 |

As shown in the table described above, the whole pigment contained in a blow-molded article having a grain pattern obtained by using only the fresh molding base resin and the pigment accounts for 2.5% by weight. The pigment of 2.75% by weight which is the sum of a weight percentage (2.5×0.5) of the pigment contained in the molding burrs and a weight percentage (base+grain=1.5) of the fresh pigment added is present in a molded article having a grain pattern obtained by using 50% by weight of the molding burrs obtained in this molding and 50% by weight of the fresh molding base resin. It can be found that when repeating recycling in the same manner, a final percentage of the pigment component is 3% by weight in the case of the example described above and satisfies the equation described above and that a final percentage of the base color pigment component converges into a fixed value as well. That is, it can be found that in the case of the example described above, the blow-molded articles obtained after the second recycling, particularly the fourth recycling have uniform color tones and that the blow-molded articles in which grain patterns are revealed well are obtained.

The percentage of the base color pigment component obtained by the calculation described above is a final percentage of the pigment component obtained when continuing to add the recycled material in a fixed proportion, and this pigment component percentage is not obtained immediately after starting to put the recycled material. That is, in a course where this final pigment component percentage is not yet reached, a percentage of the pigment component contained in the article results in continuing to change, and a base color tone (ground color) of the article changes by the effect of the pigment eluted into the molding material. In the case of the present blow molding, the pigment contained in the color pigment master batch which is added every time and reveals grain patters is not eluted into the molding material, so that the ground color of the article changes by virtue of the elution of the color pigment component contained in the recycled material. When a base component for a ground color is added in addition to the color pigment component for revealing a grain pattern, a final color tone of the ground color is a color tone obtained by mixing the base color pigment with the pigment of a component percentage obtained by deducting a component percentage of the grain-tone pigment master batch added every time from a final percentage of the grain-tone pigment component contained in the article. This color tone is obtained when the grain-tone color pigment contained and remaining in the recycled material is securely redispersed in the molding material in molding as is the case with the color pigment master batch of the present invention, and when redispersibility is inferior as is the case with conventional grain-tone color pigments, the final color tone is different from expected or the color tone continues to change.

In the case of conventional pigments, this phenomenon is liable to be caused, so that a recycled material had to be reduced in a mixing amount or could not be mixed in at all. The reasons therefor are that a molding material has a very inferior compatibility with a carrier resin contained in a master batch and that a pigment is spread to a small extent, so that a pigment part is partially present or the pigment eluted into the carrier resin is less liable to be drawn out from the carrier resin. In the color pigment master batch of the present invention, a thermoplastic elastomer having a very good deformability is used, as described above, as a carrier resin, and therefore the carrier resin is readily divided or crushed into fine pieces to release the pigment by heating again and exerting a mixing force, so that the pigment is less liable to remain in the carrier resin. The pigment separating from the carrier resin is quickly dispersed into the molding base resin, and therefore eyes and accumulation mottles produced by partial presence of the pigment are not brought about. Thus, the color pigment master batch of the present invention is excellent in a redispersibility of the pigment, and therefore a ground color of the molded article is close to a fixed color by repeating recycling fixed times.

Even if the color pigment master batch is excellent in a redispersibility of the pigment, recycle-molding has to be repeated over fixed times in proportion to an addition rate of the recycled material until a ground color of the article is stabilized. As a result thereof, a lot of the articles are molded until the color is stabilized, so that a fixed amount of the defectives can not be prevented from being produced. Further, the recycled material has to have the same pigment component concentration in the respective recycled materials, so that a fixed amount thereof has to be stored every recycling and managed. Some countermeasures have to be taken in order to solve this problem. That is, in molding the molded material to which the recycled material is not added at an early stage of blow molding, only a pigment component which is equivalent to the color pigment for revealing a grain pattern described above is turned into a master batch with a carrier resin having as good dispersibility as that of the carrier resin contained in the base color pigment master batch for a ground color, and this grain color pigment master batch is added supplementing a portion obtained by deducting a percentage of the color pigment component for a grain tone from a final percentage of the pigment component contained in the article which is calculated from the foregoing predetermined addition amount ratio of the recycled material to the molding material. This makes it possible to mold an article having a pigment component percentage which is equivalent to a final pigment component percentage from the begging of the production. It becomes possible to provide a recycled material, and after starting the addition of the recycled material, the grain color pigment master batch having a good dispersibility is stopped adding and switched over to the prescribed color pigment master batch. A ground color of the article thus molded makes it possible to mold an article without causing color change from molding in the first cycle. Further, it becomes unnecessary to separately control the recycled materials every recycling.

Thus, a good dispersibility of the color of the color pigment providing grain patterns is an important performance in stably recycling molding burrs. Use of the color pigment master batch for a grain tone of the present invention makes it possible to produce an article having a grain-tone appearance at a low cost by the same molding method as conventional molding methods.

EXAMPLES

Next, the present invention shall be explained in further details with reference to examples, but the present invention shall by no means be restricted by these examples.

Examples 1 to 4

Comparative Examples 1 and 2

Those shown in Table 2 and table 3 were used for a molding material resin, a color pigment (pigment for a gain tone), a master batch and a base color pigment master batch. In Table 2, E-150GK is blocked polypropylene manufactured by Idemitsu Petrochemical Co., Ltd. Used were pigment master batches for a grain tone shown in Examples 1 to 4 and Comparative Example 1 in which the proportions of a thermoplastic elastomer, polyolefin, a pigment component and other additives were 45% by weight, 20% by weight, 30% by weight and 5% by weight respectively. In this case, the thermoplastic elastomer is a polyester base thermoplastic elastomer manufactured by Toyo Boseki Co., Ltd., and used were Pelprene P-150B in Example 1, Pelprene P-280B in Examples 2 and 3, Pelprene S-3001 in Example 4 and Pelprene P-80C in Comparative Example 1. The polyolefin is low density polyethylene. Used as the other additives were 0.45% by weight of sodium stearate as a dispersant and 4.5% by weight of modified polypropylene. The modified polypropylene is Polytac H-1000P having an acid-added amount of 5% by weight manufactured by Idemitsu Petrochemical Co., Ltd. The commercial pigment used in Comparative Example 2 is a pigment for a grain tone in which partially cross-linked polyolefin usually used in extrusion molding is used as a carrier resin and which is field-proven in blow molding. The color combinations and the addition amounts of the pigments for a grain tone and the base pigments used are shown in Table 3.

A die used in molding is a compressed rectangular bottle die having a capacity of 1.8 liter, wherein it is crimped on one face and not crimped on the other face. A molding machine used is a V8 type blow-molding machine (accumulator type) manufactured by Nippon Seiko Co., Ltd. Molding conditions shown in Table 4 were set based on a state in which the unmolten pigment for a grain tone was not present on an extruding parison and the pigment did not form islands in the form of a solid. An extrusion amount of the molding material for molding one bottle having a capacity of 1.8 liter was set to 0.2 to 0.25 liter, and the blowup ratio was set to 2 to 3 times. The molded article has an average thickness of 2 to 3 mm and a weight of 170 to 180 g.

Evaluated were a grain feeling and a recycling property of the bottles obtained by blow molding. In the evaluation of the grain feeling, the bottle in which a stripy grain (straight grain) was revealed on the whole part thereof was shown by ○; the bottle in which a stripy feeling was low or a clarity was low was shown by Δ; and the bottle in which straight grain stripes were not produced was shown by X. In the evaluation of the recycling property, 100% of a crushed material obtained by crushing the molded bottle was molded again on the same conditions, except that the pigment master batch for a grain tone was not added, wherein a case where stripes of a grain color were not present and the color tone was even was shown by ○; a case where a little shade of the color was observed was shown by Δ; and a case where color stripes were present was shown by X.

The unit of MFR shown in Table 2 is g/10 minutes, and the Vicat softening point was measured based on ASTM D 1525. The crystal melting point was measured by means of a differential scanning type calorimeter, and the MFR was measured based on ASTM D 1238. In Table 4, the temperatures of C1 to C3 mean resin temperatures at a part connected to the extruding head and a tip part of the plasticization extruding device which is close thereto, and C1, C2 and C3 are closer to the resin feeding port in this order. The tip part of the plasticization extruding device is also called a melt-extruding zone in an extruding machine. The temperatures of D1 to D3 mean resin temperatures at the acume head (extruding head), and the molding material is extruded through the head in order of D1, D2 and D3 and reaches an outlet of the extruding machine.

TABLE 2

| | Molding base resin | | | Pigment master batch for grain tone | | | |
| | | | | Thermoplastic resin | | | |
| | Grade | MFR | Melting temperature (° C.) | Kind | MFR | Crystal melting point (° C.) | Vicat softening point (° C.) |
| --- | --- | --- | --- | --- | --- | --- | --- |
| Example 1 | E-150GK | 0.6 | 160 | Pelprene P-150B | 20 | 212 | 190 |
| Example 2 | E-150GK | 0.6 | 160 | Pelprene P-280B | 17 | 218 | 199 |
| Example 3 | E-150GK | 0.6 | 160 | Pelprene P-280B | 17 | 218 | 199 |
| Example 4 | E-150GK | 0.6 | 160 | Pelprene P-3001 | 16 | 216 | 193 |
| Comparative Example 1 | E-150GK | 0.6 | 160 | Pelprene P-80C | 18 | 203 | 154 |
| Comparative Example 2 | E-150GK | 0.6 | 160 | Commercial pigment for grain tone | | | |

TABLE 3

| | Pigment master batch for grain tone | | | Base color pigment master batch | | |
| | Pigment | | | | Pigment | |
| | Addition amount (wt %) | Color tone | Carrier resin | | Addition amount (wt %) | Color tone |
| --- | --- | --- | --- | --- | --- | --- |
| Example 1 | 0.5 | Dark brown | Low density polyethylene | | 2 | Beige |
| Example 2 | 0.5 | Dark brown | Low density polyethylene | | 2 | Beige |
| Example 3 | 0.5 | Orange | Low density polyethylene | | 2 | Cream |
| Example 4 | 0.5 | Orange | Low density polyethylene | | 2 | Beige |
| Comparative Example 1 | 0.5 | Dark brown | Low density polyethylene | | 2 | Beige |
| Comparative Example 2 | — | Dark brown | Low density polyethylene | | 2 | Beige |

TABLE 4

| | Molding conditions C1 to C3: extruding machine D1 to D3: acume head | | | | | | Resin temperature (measured) (° C.) | | Evaluation results | |
|---|---|---|---|---|---|---|---|---|---|---|
| | C1 | C2 | C3 | D1 | D2 | D3 | Outlet of extruding machine | Parison | Grain feeling | Recycling property |
| Example 1 | 180 | 190 | 200 | 220 | 220 | 220 | 200 | 235 | ○ | ○ |
| Example 2 | 180 | 190 | 210 | 220 | 220 | 220 | 205 | 235 | ○ | ○ |
| Example 3 | 180 | 190 | 210 | 220 | 220 | 220 | 205 | 235 | ○ | ○ |
| Example 4 | 180 | 190 | 210 | 220 | 220 | 220 | 205 | 235 | Δ | ○ |
| Comparative Example 1 | 180 | 190 | 200 | 220 | 220 | 220 | 205 | 235 | Δ | ○ |
| Comparative Example 2 | 210 | 220 | 230 | 230 | 230 | 230 | 225 | 245 | X | X |

Test Example 1

The bottles obtained in Examples 1 and 2 and Comparative Example 2 were evaluated for physical properties. The tensile physical property was evaluated with a sample which was stamped out from a bottle side face having no crimps in a direction parallel to a parison extruding direction, and a sample for evaluating a strength of the pinch-off part was cut out from the pinch-off part at a bottom of the rectangular bottle so that the pinch-off part became a center thereof, and it was evaluated by a tensile test. Further, a molding material to which both the color pigment master batch for a grain tone and the base color master batch were not added was used to produce the same bottle, and the same tests were carried out. The evaluations were carried out based on JIS K 7113.

TABLE 5

| | Example 1 | Example 2 | Comparative Example 2 | No colorant added |
|---|---|---|---|---|
| Tensile yield strength (MPa) | 25.7 | 24.8 | 26.8 | 26.7 |
| Tensile rupture strength (MPa) | 19.6 | 17.3 | 8.9 | 22.3 |
| Tensile elongation (%) | 210 | 160 | 320 | 760 |
| Tensile elastic modulus (MPa) | 1280 | 1280 | 1340 | 1280 |
| Pinch-off strength (maximum point stress) (MPa) | 14.6 | 15.7 | 3.9 | 22.8 |
| Pinch-off fused part thickness (mm) | 2.6 | 2.9 | 2.2 | 2.0 |

Industrial Applicability

According to the present invention, even if an article is molded on conventional blow molding conditions, grain patterns are distinctly revealed, and the molded article is reduced in physical properties to a small extent. Further, when a recycled material is mixed in the molding material, a Change in the grain patterns and the color is scarcely brought about, and a blow-molded article having a stable grain-tone appearance can be obtained.

What is claimed is:

1. A color pigment master batch to be mixed with a molding base resin including a thermoplastic resin for blow molding, comprising a pigment and a carrier resin, wherein the carrier resin is a thermoplastic elastomer which is a crystalline thermoplastic elastomer having a Vicat softening point higher than a melting temperature of the molding base resin and a crystal melting point higher by 20° C. or more than a melting temperature of the molding base resin and in which an MFR (melt flow rate) ratio (MFR of the thermoplastic elastomer/MFR of the molding base resin) to the molding base resin is 5 or more.

2. A color pigment master batch to be mixed with a molding base resin including a thermoplastic resin for blow molding, comprising a pigment and a carrier resin, wherein the carrier resin is a thermoplastic elastomer which is an amorphous thermoplastic elastomer having a Vicat softening point higher than a melting temperature of the molding base resin and a flow-starting temperature higher by 20° C. or more than a melting temperature of the molding base resin and in which an MFR (melt flow rate) ratio (MFR of the thermoplastic elastomer/MFR of the molding base resin) to the molding base resin is 5 or more.

3. A blow molding method comprising:
controlling a temperature of a molding material including a molding base resin and a color pigment master batch at a tip part of a plasticization extruding device in a blow molding machine, the color pigment master batch including a pigment and a carrier resin, the carrier resin comprising a thermoplastic elastomer which is a crystalline thermoplastic elastomer having a Vicat softening point higher than a melting temperature of the molding base resin and a crystal melting point higher by 20° C. or more than a melting temperature of the molding base resin and in which an MFR (melt flow rate) ratio (MFR of the thermoplastic elastomer/MFR of the molding base resin) to the molding base resin is 5 or more;
delivering the molding material controlled in a temperature to an extruding head to heat the molding material to a higher temperature than a crystal melting point of the thermoplastic elastomer contained in the color pigment master batch; and
extruding the molding material from the extruding head to produce a blow-molded article having a grain tone appearance.

4. A blow molding method comprising:
controlling a temperature of a molding material including a molding base resin and a color pigment master batch at a tip part of a plasticization extruding device in a blow molding machine, the color pigment master batch including a pigment and a carrier resin, the carrier resin comprising a thermoplastic elastomer which is an amorphous thermoplastic elastomer having a Vicat softening point higher than a melting temperature of the molding base resin and a flow-starting temperature higher by 20° C. or more than a melting temperature of the molding base resin and in which an MFR (melt flow rate) ratio (MFR of the thermoplastic elastomer/MFR of the molding base resin) to the molding base resin is 5 or more;

delivering the molding material controlled in a temperature to an extruding head to heat the molding material to a higher temperature than a flow-starting temperature of the thermoplastic elastomer contained in the color pigment master batch; and extruding the molding material from the extruding head to produce a blow-molded article having a grain tone appearance.

5. A blow-molded article having a grain-tone appearance prepared by blow-molding a molding material, comprising:

a molding base resin including a thermoplastic resin;

a base color pigment master batch in an amount of 1 to 10% by weight based on the molding material and including a base color pigment and a carrier resin having a melting temperature which is not higher than a melting temperature of the molding base resin; and a color pigment master batch in an amount of 0.1 to 5% by weight based on the molding material and including a pigment and a carrier resin, wherein the carrier resin of the color pigment master batch comprises a thermoplastic elastomer which is a crystalline thermoplastic elastomer having a Vicat softening point higher than a melting temperature of the molding base resin and a crystal melting point higher by 20° C. or more than a melting temperature of the molding base resin and in which an MFR (melt flow rate) ratio (MFR of the thermoplastic elastomer/MFR of the molding base resin) to the molding base resin is 5 or more.

6. A blow molding method comprising:

adding a recycled material prepared by crushing or pelletizing molding burrs obtained in producing a blow-molded article in a prescribed amount, the blow-molded article having a grain-tone appearance prepared by blow-molding a molding material and comprising a molding base resin, a base color pigment master batch, and a color pigment master batch, the molding base resin including a thermoplastic resin, the base color pigment master batch in an amount of 1 to 10% by weight based on the molding material and including a base color pigment and a carrier resin having a melting temperature which is not higher than a melting temperature of the molding base resin, the color pigment master batch in an amount of 0.1 to 5% by weight based on the molding material and including a pigment and a carrier resin, the carrier resin of the color pigment master batch comprising a thermoplastic elastomer which is a crystalline thermoplastic elastomer having a Vicat softening point higher than a melting temperature of a molding base resin and a crystal melting point higher by 20° C. or more than a melting temperature of the molding base resin and in which an MFR (melt flow rate) ratio (MFR of the thermoplastic elastomer/MFR of the molding base resin) to the molding base resin is 5 or more; and supplementing a grain-tone pigment at an initial stage of molding cycles, where the recycled material is not added, the grain-tone pigment having a concentration obtained by deducting an addition percentage of the grain-tone pigment added in each of the molding cycles from a concentration of the residual grain-tone pigment contained in a molded article which finally converges into a fixed value by adding a prescribed amount of the grain-tone pigment in each of the molding cycles.

7. A blow-molded article having a grain-tone appearance prepared by blow-molding a molding material, comprising:

a molding base resin including a thermoplastic resin;

a base color pigment master batch in an amount of 1 to 10% by weight based on the molding material and including a base color pigment and a carrier resin having a melting temperature which is not higher than a melting temperature of the molding base resin; and a color pigment master batch in an amount of 0.1 to 5% by weight based on the molding material and including a pigment and a carrier resin, wherein the carrier resin comprises a thermoplastic elastomer which is an amorphous thermoplastic elastomer having a Vicat softening point higher than a melting temperature of the molding base resin and a flow-starting temperature higher by 20° C. or more than a melting temperature of the molding base resin and in which an MFR (melt flow rate) ratio (MFR of the thermoplastic elastomer/MFR of the molding base resin) to the molding base resin is 5 or more.

8. A blow molding method comprising:

adding a recycled material prepared by crushing or pelletizing molding burrs obtained in producing a blow-molded article in a prescribed amount, the blow-molded article comprising a molding base resin, a base color pigment master batch, and a color pigment master batch, the molding base resin including a thermoplastic resin, the base color pigment master batch in an amount of 1 to 10% by weight based on the molding material and including a base color pigment and a carrier resin having a melting temperature which is not higher than a melting temperature of the molding base resin, the color pigment master batch in an amount of 0.1 to 5% by weight based on the molding material and including a pigment and a carrier resin, the carrier resin of the color pigment master batch comprising a thermoplastic elastomer which is an amorphous thermoplastic elastomer having a Vicat softening point higher than a melting temperature of a molding base resin and a flow-starting temperature higher by 20° C. or more than a melting temperature of the molding base resin and in which an MFR (melt flow rate) ratio (MFR of the thermoplastic elastomer/MFR of the molding base resin) to the molding base resin is 5 or more; and supplementing a grain-tone pigment at an initial stage of molding cycles, where the recycled material is not added, the grain-tone pigment having a concentration obtained by deducting an addition percentage of the grain-tone pigment added in each of the molding cycles from a concentration of the residual grain-tone pigment contained in a molded article which finally converges into a fixed value by adding a prescribed amount of the grain-tone pigment in each of the molding cycles.

* * * * *